United States Patent Office 2,977,186
Patented Mar. 28, 1961

2,977,186

SEPARATION OF POTASSIUM AND/OR MAGNESIUM IONS FROM DOUBLE SALTS CONTAINING POTASSIUM AND MAGNESIUM

Maurice Rubin, Paris, France, assignor to Societe d'Etudes Chimiques pour l'Industrie et l'Agriculture, Paris, France, a French company No Drawing. Filed Mar. 10, 1958, Ser. No. 720,030

Claims priority, application France Mar. 12, 1957

9 Claims. (Cl. 23—67)

This invention relates to a method of separating potassium and magnesium ions from double salts containing potassium and magnesium ions. One example of such a double salt is carnallite, in which the magnesium present in the raw material can, by the process of the invention, be separated as a valuable product.

Carnallite ore is generally considered as a source of potassium and in the majority of conventional processes actually used for extracting potassium, the magnesium is retained in form of hydrated magnesium chloride which represents a substantially valueless by-product. It is accordingly an important object of the invention to increase the commercal value of carnallte and similar ores by recovering the magnesium contained therein as valuable magnesia hydrate or magnesium carbonate.

In the natural state double salts containing potassium and magnesium have generally mixed thereto, in addition to other magnesium salts such as the sulfate, comparatively high amounts of sodium salts and especially sodium chloride. Thus carnallite ore for example frequently contain as much as 30 to 40% sodium chloride. It is an object of this invention, and an essential advantage of the method provided thereby, that such ores comprising mixtures more or less rich in sodic salts, can readily be treated.

In the applicant's French Patent No. 1,116,015, filed December 7, 1954, a method was described involving treatment of carnallite in an aqueous medium with an aliphatic amine and carbonic acid gas in quantities substantially corresponding to the stoichiometric ratio, thereby simultaneously precipitating the potassium and the magnesium in the form of the double salt $KHCO_3.MgCO_3.4H_2O$, called Engel's salt.

It has now been discovered that the potassium can be separated from magnesium from a double salt containing said elements and particularly in carnallite, by means of an aliphatic amine or an aliphatic amine carbonate, by operating in strictly predetermined conditions to be specified hereinafter. In the treatment of a carnallitic ore containing sodium chloride, the ions can be separated either by precipitating exclusively the magnesium in the form of an insoluble compound while the sodium and potassium are retained in solution, or precipitating both magnesium and sodium, with only the potassium remaining in solution. According to the invention, the separation can be realized by one way or the other.

By treating a carnallitic ore containing any proportion of sodium, in an aqueous medium, with a quantity of aliphatic amine or aliphatic amine carbonate not higher than about 20% excess over the stoichiometric ratio on the basis of the amount of magnesium used, it is found that at least 98% of the magnesium will precipitate in the form of magnesia hydrate or magnesium carbonate according as the reagent used is amine or amine carbonate, while the potassium and sodium are retained in solution. While the reaction will already proceed at ordinary temperature, its rate is increased if the temperature is raised whereby a purer well filtering product can be obtained. For optimum conditions of magnesia formation, it is preferred to operate at temperatures above about 60° C., preferably in the range 60° C. to 80° C., and for optimum conditions of magnesium carbonate formation the preferred temperature range is about 80° C. and higher. The separation of the magnesian compound from the hot solution can then be effected by filtering or in any other convenient way.

When the separating procedure just mentioned is used, i.e. that involving exclusive precipitation of magnesium as an insoluble compound, carnallite ore containing substantially any proportion of sodium chloride can be treated. In order however to facilitate subsequent recovery of the potassium, it is preferable to apply the procedure just mentioned to the treatment of carnallite stock that is practically free of sodium or is poor in sodium chloride. In such case the reagents, after separation of the magnesian compound, will yield a concentrated potassium solution containing no sodium or only small amounts of sodium. As an example of ores capable of yielding especially desirable results by the application of the procedure just described, I may mention the so-called "artificial carnallite" obtained as an intermediate product in the dissolution treatment of carnallitic ores for extraction of potassium chloride.

If a carnallitic ore containing not less than 20% sodium chloride is treated with amounts of amine carbonate in great excess over the stoichiometric ratio on the basis of the magnesium present, e.g. an excess greater than 20%, a complex salt of sodium and magnesium precipitates, which is the chlorocarbonate $NaCl.Na_2CO_3.MgCO_3$. At least 98% of the magnesium, and more than 80% of the sodium initially present, can be precipitated in this form if suitable proportions of amine carbonate are used, i.e. an amount not smaller than the stoichiometric quantity on the basis of the sodium and magnesium initially present. Just as in the foregoing case, the reagents are desirably reacted at about 80° C. or higher, and the precipitate is separated from the hot solution which contains all of the potassium initially present and only contains small amounts of sodium. Depending on the sodium content in the carnallite used, chlorocarbonate of sodium and magnesium alone is obtained, or the same in admixture with a more or less large amount of magnesium carbonate.

The second separating procedure just described is especially suitable for mixtures that are rich in sodium chloride, since the valuable magnesian compound is then readily recoverable from the sodium and magnesium chlorocarbonate precipitate by conventional methods. Thus the sodic salts may for example be extracted with hot water to produce magnesium carbonate, or they may be heated to high temperature and washed with water to provide magnesia.

Regardless of the procedure used the reactions comprising the method of the invention proceed in an aqueous medium and the amounts of water added play a critical part in the process and should be controlled within accurately predetermined limits for best results and economical operation. Thus the mother liquor should not be excessively dilute in order to enable economical recovery of the salts remaining in solution after separation of the insoluble magnesian compound. If on the other hand the amount of water used is too low, highly viscous mixtures are obtained which are difficult to stir and the reaction will not proceed uniformly. Moreover part of the soluble salts remaining in undissolved condition precipitate with the magnesian compound so that some potassium is lost when the precipitate is washed.

To obtain the best results water should be added in a quantity within the approximate range of from 80 to 110 parts by weight of water for 100 parts by weight of true carnallite KCl.MgCl$_2$.6H$_2$O contained in the stock ore treated. Where the initial carnallite stock contains no or only little sodium chloride the amount of water added is preferably near to the lower limit of the above mentioned range, e.g. from 80 to 95 parts water per 100 parts carnallite. Where on the other hand the initial carnallite material is rich in sodium chloride (e.g. 30 to 40% NaCl) the upper limit of the range should preferably be used, i.e. approximateyl from 90 to 110 parts water per 100 parts carnallite, by weight.

The procedure used in the method of the invention is principally determined by the quality of the final magnesian product that it is desired to obtain. Certain specific uses of magnesia and magnesium carbonate require high purity products whereas for other uses reasonable amounts of impurities, e.g. calcium, are permissible.

An essential advantage of the method of the invention is that it is readily adaptable to current market conditions in respect to the magnesian compounds produced, since it makes it possible to manufacture high-purity products or more ordinary grades at will.

To prepare a pure product the carnallitic ore is dissolved in water prior to the reaction, whereby any insoluble impurities can then be removed by filtering. The amine reagent is then added, which reagent preferably comprises substantially water-free amine, alone or together with carbonic acid gas or a solid amine carbonate if it is desired to avoid an excessive dilution of the medium. However, an aqueous solution of amine or amine carbonate may be used in cases where a highly pure grade of final magnesian compound is to be prepared, because in such conditions it is economically feasible to operate in more dilute media since the higher cost of potassium extraction is counterbalanced by the fact that a more valuable magnesian product is recovered.

To manufacture magnesian compounds having a reasonable tolerance as to the impurity content therein, the solid stock may be added in one or more batches to an amine or amine carbonate solution.

The concentration of the amine reagent may be accurately adjusted to a desired value prior to adding the solid. Alternatively there may initially be added a more highly concentrated amine reagent and one or more predetermined amounts of water may then be added during the reaction to restore the correct concentration. This procedure involving adjustment of the concentration of the reagent during reaction is of especial advantage in the treatment of carnallitic ores that are poor in NaCl since they have a tendency to yield more viscous mixtures when added to comparatively dilute amine reagents.

After the reaction mixture has been prepared by either of the procedures described, the desired temperature is maintained while stirring the mixture for a sufficient time to achieve complete precipitation of the insoluble compound. The precipitate is then separated out of the hot solution for example by filtering or in any other suitable way. Cooling the filtrate will separate the potassium chloride from the solution; if cooling down to ambient temperature (about 20° C.) the yield of recovery is from about 80 to 85% in terms of the initial KCl used, and at still lower temperatures, as from 0 to 10° C., the yield is about 85 to 90% of the KCl used.

According to a modified procedure the reaction mixture may be cooled prior to separation of the insoluble magnesian compound. Thus the potassium chloride or mixture of sodium and potassium chlorides present in the solution are precipitated out. In this modification of the invention relatively low amounts of water may be used since it no longer is necessary to dissolve the alkali metal chloride or chlorides present in the starting stock. It has been found that in such conditions as little as 45 parts by weight of water per 100 parts carnallite may be used without hindering the operation.

The solid mixture obtained after cooling is treated before or after removal of the solution to separate the various constituents therefrom. This can be done by any suitable process e.g. flotation.

The residual solution obtained after recovery of the potassium chloride is treated in known manner to regenerate the amine and the regenerated amine is recycled. In order to ensure that the amine can be regenerated in economically satisfactory conditions, the amines used in the method of this invention preferably are low-molecular weight amines having relatively low boiling points. Thus, primary, secondary or tertiary aliphatic amines are preferably used wherein the hydrocarbon radical contains from 1 to 4 carbon atoms (i.e. methylamines, ethylamines, propylamines, butylamines) and having boiling points lower than 100° C. at atmospheric pressure.

Some examples of the process of the invention will now be described for purposes of illustration but not of limitation.

*Example 1*

To 216 parts by weight of an aqueous solution of neutral dimethylamine carbonate tilting 50.5% amine carbonate, 143 parts are added of a sodic carnallite material containing 5.95% Mg, 9.65% K and 12% Na. The mixture is heated to 80° C. and the temperature is maintained while stirring the mixture for about 2 hours. The reaction mixture is then filtered hot to separate the precipitate from the potassium-containing solution. The precipitate is summarily washed yielding 56 parts of a solid containing Na 18.0%, Mg 15.0%; Cl 8.95%; CO$_3$ 49.4%, K 0.4%. This solid comprises 66% of the chlorocarbonate NaCl.Na$_2$CO$_3$.MgCO$_3$ and 33% basic magnesium carbonate. The solid is heated to red heat and washed with water, whereby the magnesia is recovered. The potassium-containing solution is cooled to about 0° C. and practically sodium-free potassium chloride is thus recovered with a yield of about 88% in terms of the potassium chloride initially present. After separation of the precipitate the residual solution is treated by conventional methods for regenerating the dimethylamine.

*Example 2*

A sodic carnallite containing about 10% sodium chloride (composition Mg 7.65%, K 12.4%, Na 4.1%) is processed in accordance with the invention. 151 parts of this carnallite material are added to 240 parts of dimethylamine carbonate containing 47% amine carbonate. The mixture is heated to from 80° C. ot 85° C. and maintained in this temperature range with agitation for about 2 hours, then filtered hot. 47 parts by weight are obtained of a solid consisting of basic magnesium carbonate containing 23.9% Mg and 47.8% CO$_3$. The filtrate is cooled to about 15° C. and this results in precipitating 82% of the initially reacted potassium chloride.

*Example 3*

In an autoclave containing a solution comprising 100 parts by weight of a carnallite material containing 97.8% KCl, MgCl$_2$.6H$_2$O dissolved in 94 parts water at 80° C., 47 parts of isopropylamine containing 98.7% amine are added. The mixture is stirred while holding the temperature to between 75 and 80° C. for about 2 hours. The hot solution is filtered to separate the magnesia formed. After washing and drying, 21 parts of a solid are obtained containing 39.7% Mg. On cooling the filtrate to about 20° C., 85% of the potassium chloride initially used are recovered.

*Example 4*

To 242 parts of a solution of neutral diethylamine carbonate containing 62% amine, 167 parts are added of a carnallite stock containing Mg 5.1%, K 8.25%, Na 15.85%. The mixture is heated to 85° C. and stirred for about 2 hours at this temperature. After reaction the mixture is cooled to about 0° C., filtered, and yields on the one hand a residual solution which is treated for recovering the amine, and on the other hand 111 parts of a solid containing K 11.5%, Mg 7.6%, Na 21.5%, Cl 20.9%, $CO_3$ 38.0%. The solid consists of a mixture of potassium chloride and sodium and magnesium chlorocarbonate. It contains 92.5% of the KCl initially reacted which 92.5% can be recovered by conventional flotation techniques. After separation of the potassium chloride the chlorocarbonate is treated to obtain magnesium carbonate.

What I claim is:

1. In a method of treating material comprising essentially carnallite and sodium chloride as impurity, the step of reacting said material with a compound selected from the group consisting of alkylamine and alkylamine carbonate in a quantity not less than that corresponding to the stoichiometric ratio on the basis of the magnesium contained in said material in the presence of a quantity of water comprised between about 80 and about 110 parts per 100 parts carnallite by weight at a temperature not less than about 60° C. whereby the magnesium is precipitated as an insoluble compound and separating the precipitate from the potassium-containing solution.

2. In a method of treating material comprising essentially carnallite and further sodium chloride as impurity, said sodium chloride being preferably in proportion less than about 20%, the step of reacting said material with an alkylamine in a quantity not less than that corresponding to the stoichiometric ratio on the basis of the magnesium contained in said material in the presence of a quantity of water comprised between about 80 and about 110 parts per 100 parts of carnallite by weight at a temperature not less than about 60° C., whereby the magnesium is precipitated as magnesium hydroxide and separating the precipitate from the potassium and sodium containing solution.

3. In a method of treating material comprising essentially carnallite and further sodium chloride as impurity, said sodium chloride being preferably in proportion less than about 20%, the step of reacting said material with an alkylamine in carbonate form in a quantity not less than that corresponding to the stoichiometric ratio on the basis of the magnesium contained in said material but less than about 20% in excess in the presence of a quantity of water comprised between about 80 and about 110 parts per 100 parts carnallite by weight at a temperature not less than about 60° C. whereby the magnesium is precipitated as magnesium carbonate and separating the precipitate from the potassium and sodium containing solution.

4. In a method of treating carnallite ore containing more than about 20% sodium chloride therein, the step of reacting said ore with an alkylamine carbonate in a quantity not less than that corresponding to the stoichiometric ratio on the basis of the magnesium and sodium present in said ore in the presence of a quantity of water comprised betwen about 80 and about 110 parts per 100 parts carnallite by weight at a temperature not less than about 60° C. whereby magnesium and sodium are precipitated as magnesium and sodium chlorocarbonate and separating the precipitate from the potassium-containing solution.

5. The method claimed in claim 1, wherein said alkylamine is selected from within the group consisting of primary, secondary and tertiary alkylamines having from 1 to 4 carbon atoms in the hydrocarbon radical thereof and having a boiling point not higher than about 100° C.

6. In the method claimed in claim 1, the further step of cooling final solution to a temperature not higher than about 20° C. whereby potassium chloride is precipitated and separating the precipitate from the solution.

7. Method in accordance with claim 2 wherein the quantity of water is about 80 to 95 parts per 100 parts of carnallite and the temperature is between 60 and 80° C.

8. Method in accordance with claim 3 wherein the quantity of water is about 80 to 95 parts per 100 parts of carnallite and the temperature is at least 80° C.

9. Method in accordance with claim 4 wherein the quantity of water is about 90 to 110 parts per 100 parts of carnallite and the temperature is at least 80° C.

References Cited in the file of this patent

UNITED STATES PATENTS

| | | |
|---|---|---|
| 1,427,444 | Cramer | Aug. 29, 1922 |
| 1,563,613 | Dolbear | Dec. 1, 1925 |
| 1,774,040 | Rusberg | Aug. 26, 1930 |
| 2,394,570 | Sturbelle | Feb. 12, 1946 |
| 2,752,222 | Berman | June 26, 1956 |
| 2,768,060 | Follows | Oct. 23, 1956 |
| 2,782,093 | Hulot et al. | Feb. 19, 1957 |

FOREIGN PATENTS

| | | |
|---|---|---|
| 403,860 | Great Britain | Jan. 4, 1934 |